(12) United States Patent
Tsuruta et al.

(10) Patent No.: US 10,062,878 B2
(45) Date of Patent: Aug. 28, 2018

(54) ELECTRIC STORAGE APPARATUS

(71) Applicant: GS Yuasa International Ltd., Kyoto-shi (JP)

(72) Inventors: Shogo Tsuruta, Kyoto (JP); Masamitsu Tononishi, Kyoto (JP); Ryutaro Nishikawa, Kyoto (JP)

(73) Assignee: GS YUASA INTERNATIONAL LTD., Kyoto-shi, Kyoto (JP)

( * ) Notice: Subject to any disclaimer, the term of this patent is extended or adjusted under 35 U.S.C. 154(b) by 446 days.

(21) Appl. No.: 14/244,772

(22) Filed: Apr. 3, 2014

(65) Prior Publication Data
US 2014/0302378 A1    Oct. 9, 2014

(30) Foreign Application Priority Data

Apr. 8, 2013 (JP) .................................. 2013-080624
Mar. 12, 2014 (JP) .................................. 2014-049168

(51) Int. Cl.
*H01M 2/10* (2006.01)
*H01M 2/14* (2006.01)

(52) U.S. Cl.
CPC ....... *H01M 2/1061* (2013.01); *H01M 2/1077* (2013.01); *H01M 2/1094* (2013.01); *H01M 2/14* (2013.01)

(58) Field of Classification Search
None
See application file for complete search history.

(56) References Cited

U.S. PATENT DOCUMENTS

| 2007/0133151 | A1* | 6/2007 | Jeon ..................... | H01M 2/1016 361/600 |
| 2010/0104927 | A1* | 4/2010 | Albright ............. | H01M 2/0242 429/50 |
| 2010/0190050 | A1 | 7/2010 | Ochi | |
| 2012/0003526 | A1* | 1/2012 | Kume ................. | H01M 2/0262 429/151 |

(Continued)

FOREIGN PATENT DOCUMENTS

| JP | 2009-277471 A | 11/2009 |
| JP | 2010-176997 A | 8/2010 |

(Continued)

OTHER PUBLICATIONS

Japanese Office Action dated Aug. 1, 2017, with an English translation.

*Primary Examiner* — Maria J Laios
(74) *Attorney, Agent, or Firm* — McGinn IP Law Group, PLLC

(57) ABSTRACT

An electric storage apparatus includes an insulation frame and electric storage device. The insulation frame includes a main plate portion in contact with the electric storage device, a first flange portion provided at one end portion of the main plate portion in a predetermined direction parallel to the main plate portion, and second flange portion provided at the other end portion of the main plate portion in the predetermined direction. The first flange portion has a pressing portion including a projecting portion projecting to be pressed on the electric storage device. The second flange portion includes a support portion which is in contact with the electric storage device on an opposite side with respect to the projecting portion.

19 Claims, 14 Drawing Sheets

(56) References Cited

U.S. PATENT DOCUMENTS

2013/0316211 A1* 11/2013 Kim .................... H01M 2/1077
429/99
2014/0023893 A1 1/2014 Shimizu et al.

FOREIGN PATENT DOCUMENTS

| JP | 2012-119157 A | 6/2012 |
| JP | 2012-248482 A | 12/2012 |
| JP | 2013-004341 A | 1/2013 |

* cited by examiner

ELECTRIC STORAGE APPARATUS

CROSS-REFERENCE TO RELATED APPLICATIONS

This application claims priorities of Japanese Patent Application Nos. 2013-080624 filed on Apr. 8, 2013 and 2014-049168 filed on Mar. 12, 2014 the content of which is incorporated herein by reference.

FIELD

The present invention relates to an electric storage apparatus including an insulation frame and an electric storage device.

BACKGROUND

As an assembled battery (battery module) including a plurality of stacked electric storage devices with a spacer interposed therebetween, there is known an electric storage apparatus that includes an insulation frame such as a spacer arranged on an electric storage device.

In such an electric storage apparatus, the insulation frame generally includes a main plate portion which is arranged on the electric storage device and a plurality of flange portions which are provided on a peripheral portion of the main plate portion. Each flange portion is arranged so as to be opposed to an outer peripheral surface of the electric storage device. The electric storage device is positioned by the flange portions.

JP 2013-004341 A discloses a structure in which ribs project from a main plate portion of an insulation frame and extend in a lateral direction. In a state where an electric storage device and the main plate portion of the insulation frame are alternately stacked, the ribs are sandwiched between the main plate portion and the electric storage device and resiliently deformed to be bent. Such a structure can prevent movements or rattling of the electric storage device, which is sandwiched between the main plates, in a direction orthogonal to the main plate.

Conventional electric storage apparatuses including the one disclosed in JP 2013-004341 A had not particularly considered to suppress rattling of an electric storage device in a direction parallel to a main plate portion of an insulation frame.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to suppress, in an electric storage apparatus in which a main plate portion of an insulation frame is stacked on an electric storage device, movements of the electric storage device in the direction parallel to the main plate portion.

One aspect of the present invention provides an electric storage apparatus comprising an insulation frame and an electric storage device. The insulation frame comprises a main plate portion which is in contact with the electric storage device, a first flange portion which is provided at one end portion of the main plate portion in a predetermined direction parallel to the main plate portion, and a second flange portion provided at the other end portion of the main plate portion in the predetermined direction. The first flange portion includes a pressing portion which includes a projecting portion projecting from a surface facing the electric storage device to be pressed on the electric storage device. The second flange portion includes a support portion which is in contact with the electric storage device on an opposite side with respect to the projecting portion in the predetermined direction.

BRIEF DESCRIPTION OF DRAWINGS

The foregoing and the other features of the present invention will become apparent from the following description and drawings of an illustrative embodiment of the invention in which.

DESCRIPTION OF EMBODIMENTS

Figure 1:
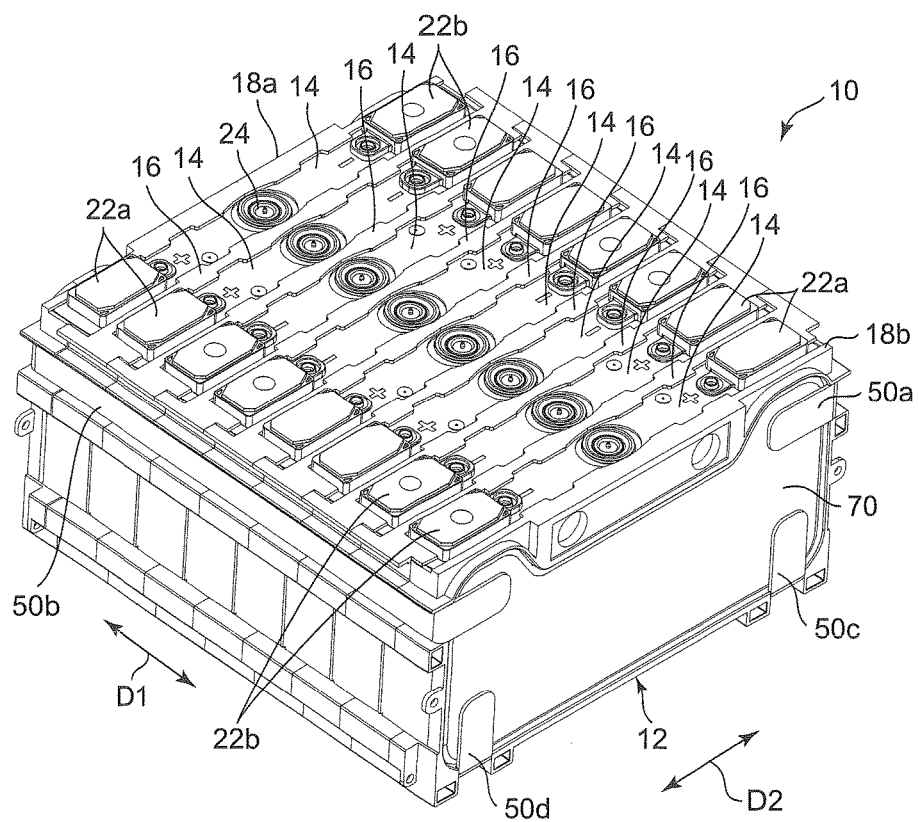
FIG. 1 is a perspective view showing an electric storage apparatus according to a first embodiment of the present invention.

One aspect of the present invention provides an electric storage apparatus comprising an insulation frame and an electric storage device. The insulation frame comprises a main plate portion which is in contact with the electric storage device, a first flange portion which is provided at one end portion of the main plate portion in a predetermined direction parallel to the main plate portion, and a second flange portion provided at the other end portion of the main plate portion in the predetermined direction. The first flange portion includes a pressing portion which includes a projecting portion projecting from a surface facing the electric storage device to be pressed on the electric storage device. The second flange portion includes a support portion which is in contact with the electric storage device on an opposite side with respect to the projecting portion in the predetermined direction.

According to the aspect of the present invention, in a state where the electric storage device is assembled with the insulation frame, the electric storage device is brought into pressure contact with the support portion of the second flange portion by the pressing portion with the projecting portion projecting from the first flange portion of the insulation frame. Therefore, rattling of the electric storage device in a lateral direction with respect to the main plate portion can be suppressed. Further, even when a size of the electric storage device is changed due to an expansion, a shrinkage or the like of the electric storage device accompanying with charging/discharging or even when the electric storage device involves an dimensional error, changing in deformation amount of the projecting portion corresponding to these factors can maintain a state where the projecting portion is in pressure contact with the electric storage device. Furthermore, when the electric storage device and the insulation frame are stacked with each other for assembling the electric storage apparatus, the electric storage device is positioned in a predetermined direction parallel to the main plate portion by the support portion with which the electric storage device is brought into pressure contact by the pressing portion.

Preferably, a plurality of the insulation frames are stacked with the electric storage device interposed therebetween, and the support portions of the plurality of the insulation frames are arranged in a direction orthogonal to the main plate portions. With this arrangement, the positions of the support portions of the plurality of the insulation frames can be aligned with each other in the direction parallel to the main plate portion. Accordingly, the position of the electric storage device which is positioned by the support portions can be aligned.

A plurality of the electric storage devices may be stacked with the main plate portion interposed therebetween. With this arrangement, movements of the electric storage devices in the direction orthogonal to the stacking direction can be suppressed.

Preferably, the center of the electric storage device is offset toward the second flange portion side in the predetermined direction with respect to a center between the surfaces of the first and second flange portions facing the electric storage device.

The first flange portion may be interposed between the electric storage device and a circuit board. With this arrangement, the first flange portion and the projecting portion are interposed between the electric storage device and the circuit board. Accordingly, heat conduction between the electric storage device and the circuit board can be suppressed. When the projecting portion is provided so that a clearance is for vied between the first flange portion and the electric storage device, the air in the clearance performs a heat insulating function. Therefore, the heat conduction between the electric storage device and the circuit board can be suppressed more effectively.

The projecting portion may be a rib. With this arrangement, the above-mentioned positioning effect can be obtained by using deformation of the rib.

Preferably, a cross-sectional shape of the rib is a shape which is gradually tapered toward a distal end thereof. With this arrangement, the rib can be easily bent and deformed.

Preferably, the projecting portion has a shape in which a projecting amount of the projecting portion toward the support portion in the predetermined direction is increased as the projecting portion approaches the main plate portion. With this arrangement, when the electric storage device is arranged on the main plate portion of the insulation frame, the distal end portion of the projecting portion can guide the electric storage device toward the support portion smoothly.

The support portion may be a flat surface. With this arrangement, the electric storage device can be stably supported by the flat support portion at an opposite side with respect to the pressing portion.

Preferably, the support portion is a projection projecting from a surface facing the electric storage device, the projection being in contact with the electric storage device in a state where the projection is deformed with a smaller deformation amount than that of the projecting portion of the pressing portion or in a state where the projection is non-deformed. With this arrangement, the electric storage device can be positioned by the support portion while interposing the projection between the second flange portion and the electric storage device.

Preferably, a deformable projecting portion is provided on a surface of the main plate portion which faces the electric storage device. With this arrangement, in a state where the electric storage device is assembled with the insulation frame, the projecting portion of the main plate portion, which is deformed, is interposed between the main plate portion and the electric storage device. Accordingly, the movements of the electric storage device in the direction orthogonal to the main plate portion can be suppressed.

Preferably, when the projecting portion is provided on the surface of the main plate portion, the projecting portion of the main plate portion is provided to be less deformable than the projecting portion of the first flange portion. With this arrangement, it is possible to suppress the excessive deformation of the projecting portion of the main plate portion when a large force is applied to the main plate portion in the direction orthogonal to the main plate portion (in the stacking direction when the plurality of the electric storage device are stacked). On the other hand, with respect to the first flange portion with which a circumstance where a force is applied is less likely to occur, only a relatively small force is basically applied to the first flange portion, and the projecting portion of the first flange portion is relatively easily deformable.

Preferably, when the projecting portion is provided on the surface of the main plate portion, the projecting portion of the first flange portion is a deformable first rib, the projecting portion of the main plate portion is a deformable second rib, and the first rib and the second rib are provided so that an end portions of the first and second ribs in a length direction are joined to each other. With this arrangement, a clearance is not formed between the first rib and the second rib. Accordingly, the intrusion of a foreign material through between the first rib and the second rib can be suppressed. Moreover, the first rib and the second rib can be formed integrally, leading to the easy formation of the insulation frame.

Preferably, when the projecting portion is provided on the surface of the main plate portion, the projecting portion of the first flange portion is a deformable first rib, the projecting portion of the main plate portion is a deformable second rib, and the first rib and the second rib are separately formed from each other. With this arrangement, the first rib and the second rib are individually deformable so that the deformation of both ribs can be enhanced. Accordingly, the electric storage device can be positioned with high accuracy in both of the directions parallel to and orthogonal to the main plate portion.

Additionally, when the first rib and the second rib are separately formed from each other, at a boundary portion between the main plate portion and the first flange portion, one end portion of the first rib in the length direction and one end portion of the second rib in the length direction are arranged at positions different from each other. With this arrangement, the first rib and the second rib are provided so that the first rib and the second rib are not joined to each other but extend to the boundary portion between the main plate portion and the first flange portion. By providing the first rib and the second rib separately formed, the electric storage device can be positioned with high accuracy in the above-mentioned two directions. Moreover, the intrusion of a foreign material through between the electric storage device and the insulation frame can be suppressed by the first rib which is formed on the first flange portion and extends to the boundary portion, and the second rib which is formed on the main plate portion and extends to the boundary portion.

Preferably, a third rib is provided on a surface of the main plate portion or the first flange portion which faces the electric storage device, and a height of the deformable second or first rib is higher than that of the third rib. With this arrangement, the electric storage device can be surely brought into pressure contact with distal end portion of the first rib or the second rib which are higher than the third rib in height. Accordingly, the deformation of the first rib or the second rib can be increased.

A plurality of projecting portions may be formed on the surface. With this arrangement, when the plurality of the projecting portions are formed on the surface of the first flange portion, the electric storage device can be positioned with respect to the first flange portion while suppressing the incline of the electric storage device. When the plurality of the projecting portions are formed on the surface of the main plate portion, the electric storage device can be positioned with respect to the main plate portion while suppressing the incline of the electric storage device. Moreover, a load added to each of the projecting portions can be distributed.

According to the aspect of the present invention, by providing the projecting portion at the first flange portion interposed between electric storage device and the first flange portion of the insulation frame, it is possible to suppress the movements of the electric storage device in the direction parallel to the main plate portion.

Hereinafter, embodiments of the present invention are explained by reference to attached drawings. For facilitating the understanding of the invention, in the attached drawings, the illustration of some parts irrelevant to the present invention is omitted.

First Embodiment

As illustrated in FIG. 1, an electric storage apparatus according to a first embodiment of the present invention is an assembled battery 10 where a plurality of electric storage devices 14 (e.g., eight) are modularized. The application of the assembled battery 10 is not limited. The assembled battery 10 can be used as e.g., an auxiliary battery of a relatively low voltage (e.g., 12V) which is mounted on a gasoline automobile, a diesel automobile or the like. In this case, the assembled battery 10 is accommodated in an outer casing (not shown in the drawing) and mounted on the automobile or the like.

Figure 2:
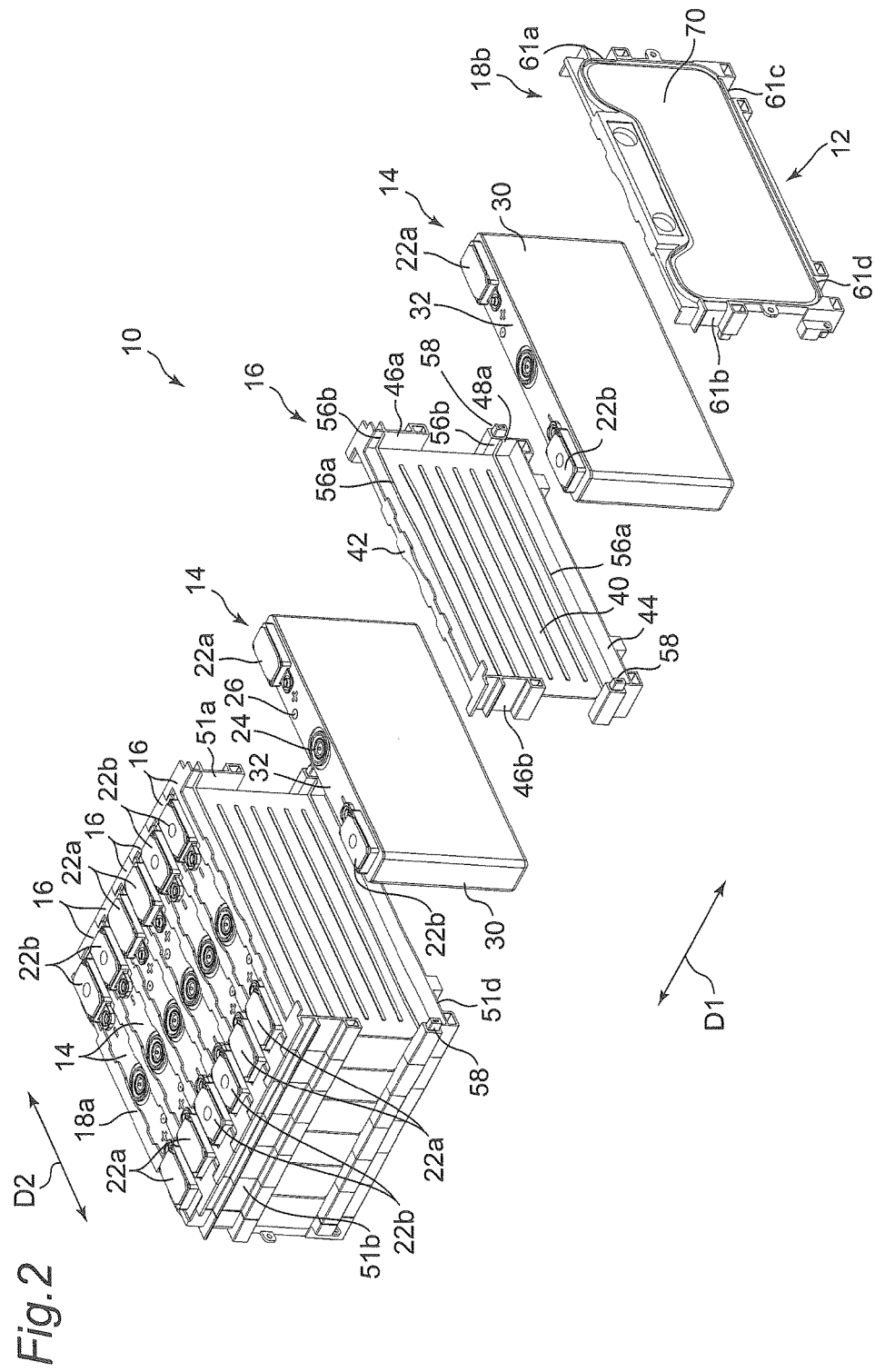
FIG. 2 is an exploded perspective view showing the electric storage apparatus shown in FIG. 1 with a part exploded.

With referring to FIGS. 1 and 2, the constitution of the assembled battery 10 is explained. In the explanation made hereinafter by reference to FIGS. 1 and 2, terms which contain "upper", "lower", and "lateral" as well as the tee in "side" indicate the directions relating to a posture of the assembled battery 10 shown in FIGS. 1 and 2. Such directions do not necessarily agree with directions of the assembled battery 10 in an actual use state.

As illustrated in FIGS. 1 and 2, each electric storage device 14 which constitutes a part of the assembled battery 10 includes a flat rectangular casing 30, and a lid body 32 which closes an upper opening portion of the casing 30. The casing 30 is e.g., made of metal. A whole surface of the casing 30 may be covered with an exterior film e.g., made of a resin (not shown in the drawing). The lid body 32 is formed of an elongated rectangular metal plate. A positive electrode terminal 22a and a negative electrode terminal 22b are mounted on both end portions of the lid body 32 in the longitudinal direction respectively. A safety valve 24 and a liquid plug 26 are mounted on the lid body 32. The electric storage device 14 is a secondary battery such as a lithium ion battery, and an electrode body and an electrolyte are housed in a space defined by the casing 30 and the lid body 32. The electric storage device 14 may be a secondary battery other than the lithium ion battery.

The plurality of electric storage devices 14 are stacked in the thickness direction (D1 direction in the drawing) of the electric storage device 14 with a spacer 16 which constitutes an insulation frame interposed between each two electric storage devices 14. An insulation material is used as a material of the spacer 16. Specifically, e.g., a resin is used as the material of the spacer 16. By interposing the spacer 16 between the electric storage devices 14 which are arranged adjacent to each other, the casings 30 of the electric storage devices 14 can be more surely electrically insulated from each other. In a state in which the electric storage devices 14 are stacked to each other as described above, terminals 22 (22a, 22b) of the electric storage devices 14 are arranged in two rows along the stacking direction (D1 direction in the drawing). In each row formed of the terminals 22, two positive electrode terminals 22a and two negative electrode terminals 22b are arranged alternately. The terminals 22 are electrically connected to each other through a plurality of bus bars (not shown in the drawing).

On both sides of the stacked body 12 in the stacking direction (D1 direction in the drawing), end plates 18a, 18b are arranged in a stacking manner with the electric storage devices 14 stacked on the outer most sides from the outside of the electric storage devices 14 respectively. The end plates 18a, 18b are made of e.g., a resin. Metal plates 70 are arranged on outer surfaces of the end plates 18a, 18b respectively and hence, a rigidity of the end plate 18a, 18b can be enhanced.

The stacked body 12 which is provided by stacking the electric storage devices 14, the spacers 16, the end plates 18a, 18b, and the metal plates 70 in the above-mentioned manner is fixed to each other by a plurality of (e.g., four) metal-made binding bands 50 (50a, 50b, 50c, 50d) so that the stacked body 12 is clamped from both sides in the stacking direction. End portions of the binding bands 50 arranged on outer sides of the metal plates 70 are fixed to the end plates 18a, 18b using e.g., bolts (not shown in the drawing) together with the metal plates 70.

Figure 6:
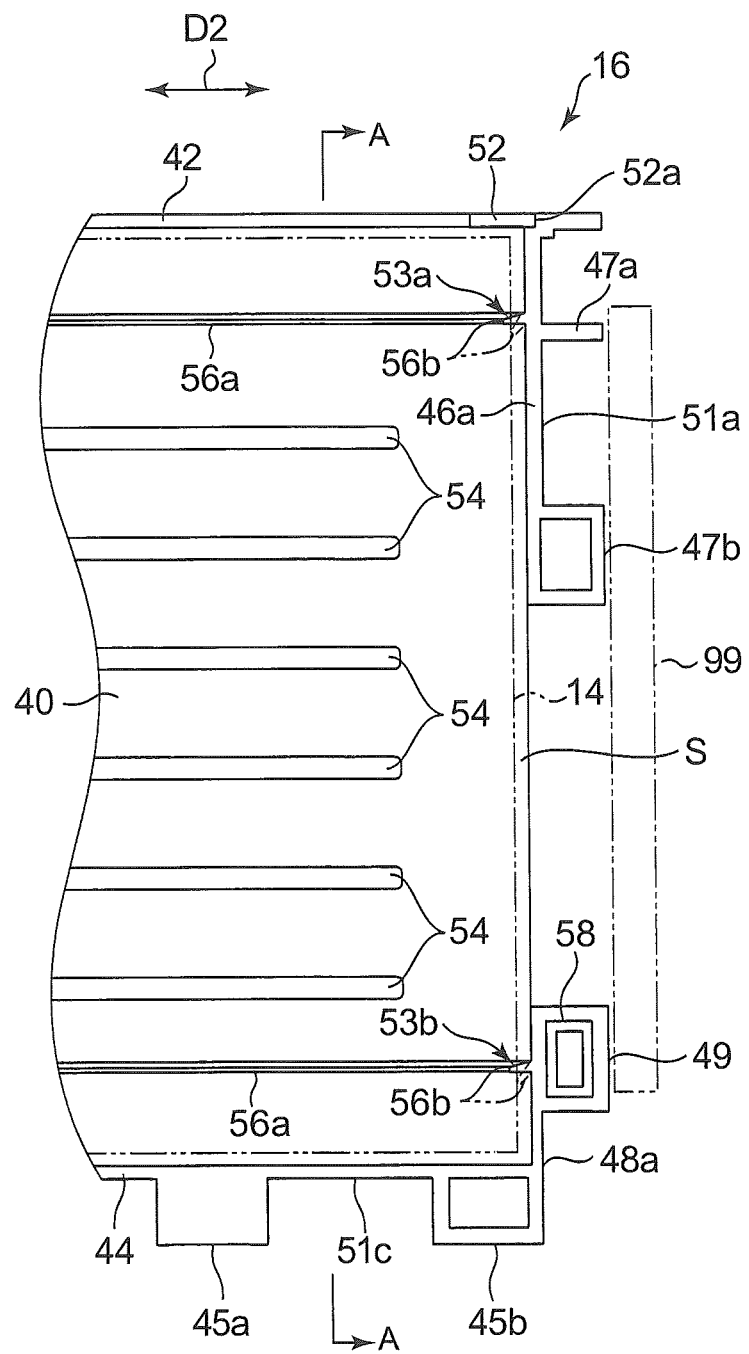
FIG. 6 is a front view of a part of the spacer shown in FIG. 3 as viewed from one side in the stacking direction.

The assembled battery 10 may include a circuit board 99 (see FIG. 6). In such a case, the circuit board 99 is mounted on e.g., a surface of the stacked body 12 on one side in the lateral direction (D2 direction in the drawing) orthogonal to the stacking direction (D1 direction in the drawing). Due to such a constitution, the circuit board 99 is arranged on the surface of the stacked body 12 different from the surface of the stacked body 12 on which the safety valve 24 is arranged. Accordingly, it is possible to prevent the circuit board 99 from being exposed to a gas discharged from the safety valve 24. The circuit board 99 is preferably arranged more inside in the stacking direction (D1 direction in the drawing) than the end plates 18a, 18b arranged on both sides of the stacked body 12. Due to such a constitution, the circuit board 99 can be protected from an external force applied in the stacking direction (D1 direction in the drawing). Further, by housing the assembled battery 10 in an exterior case (not shown in the drawing) larger than the stacked body 12 in size in the lateral direction (D2 direction in the drawing), the circuit board 99 can be housed in a space formed between an inner surface of the exterior case and the stacked body 12 in the lateral direction (D2 direction in the drawing).

Hereinafter, the specific constitution of the spacer 16 is explained mainly by reference to FIG. 3 to FIG. 7. In the explanation made hereinafter, terms which contain "upper", "lower", "right", "left" and "lateral", and a tee in "side" indicate directions relating to a posture of the spacer 16 shown in FIG. 3 (the same posture of the spacer shown in FIG. 1 and FIG. 2).

Figure 3:
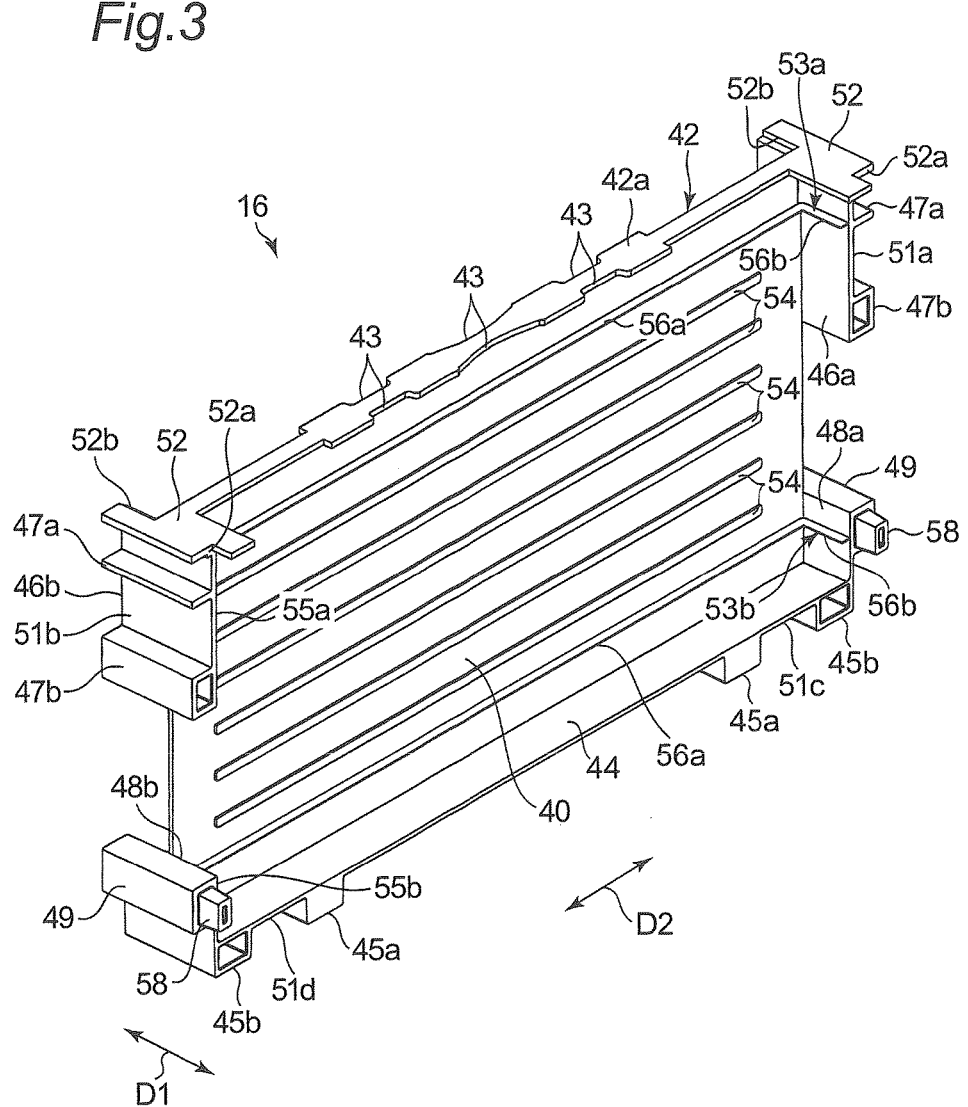
FIG. 3 is a perspective view showing a spacer of the electric storage apparatus shown in FIG. 1.
Figure 4:
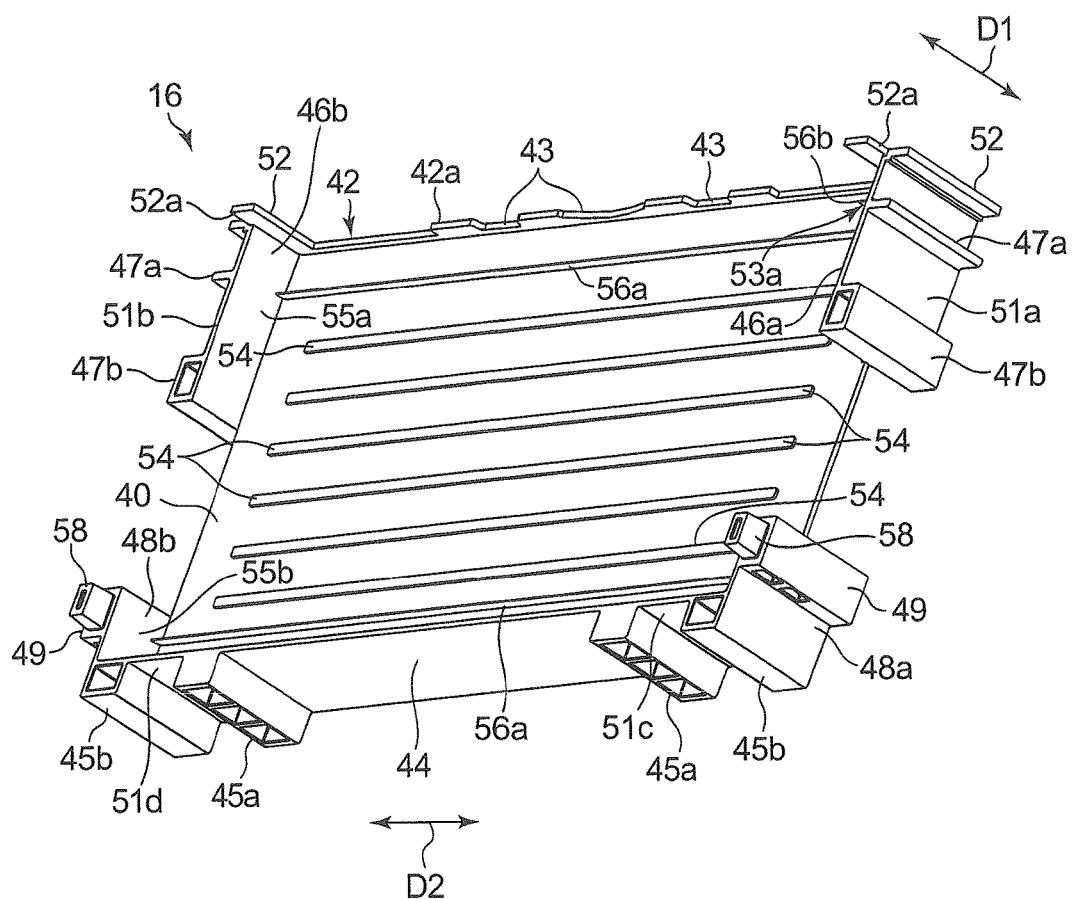
FIG. 4 is a perspective view of the spacer shown in FIG. 3 as viewed in the direction different from the viewing direction in FIG. 3.
Figure 5:
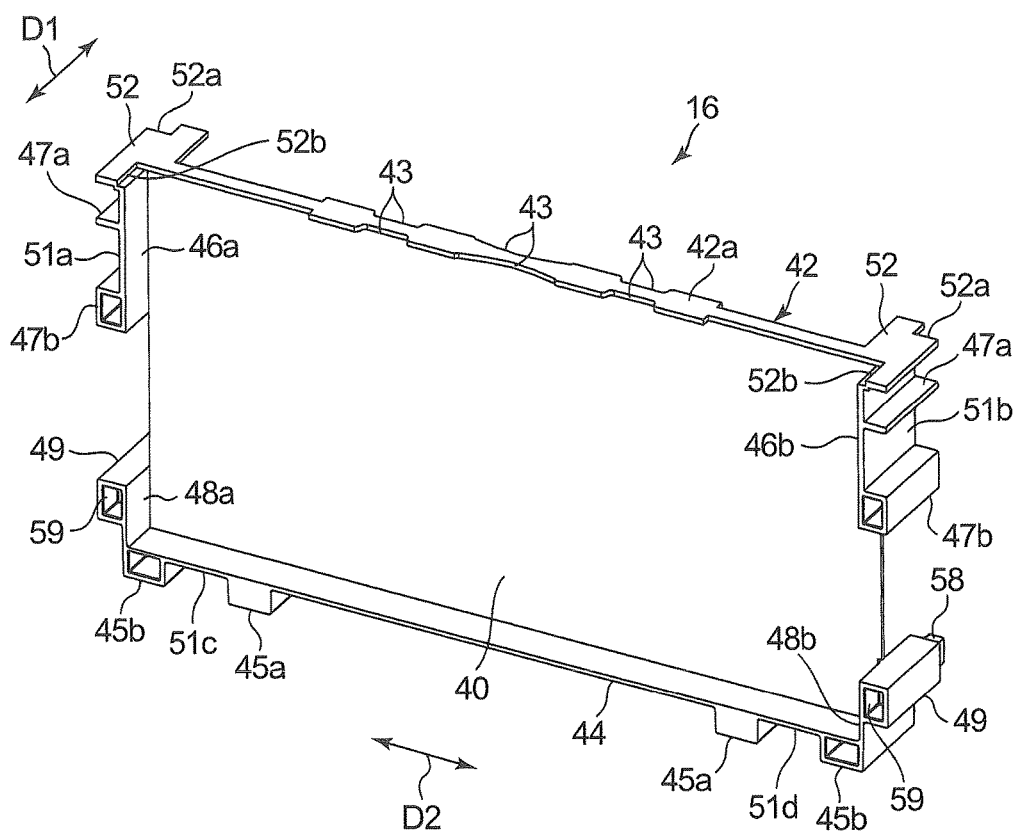
FIG. 5 is a perspective view of the spacer shown in FIG. 3 as viewed in another direction different from the viewing direction in FIG. 3.

As illustrated in FIGS. 3 to 5, the spacer 16 includes: a main plate portion 40 sandwiched between the electric storage devices 14 which are arranged adjacent to each other; and a plurality of flange portions 42, 44, 46a, 46b, 48a, 48b which are provided on a peripheral edge portion of the main plate portion 40. However, one continuous flange may be provided over the whole periphery of a peripheral edge of the main plate portion 40 by integrally forming the plurality of flange portions.

The main plate portion 40 has an approximately rectangular shape. A plurality of reinforcing ribs 54 are provided on one surface of the main plate portion 40 as illustrated in FIGS. 3 and 4. The reinforcing ribs 54 are provided so that the ribs 54 extend in the lateral direction respectively in a spaced-apart manner in the vertical direction. By providing the reinforcing ribs 54, it is possible to enhance a rigidity of the main plate portion 40 and, at the same time, it is possible to enhance a heat insulating effect between the electric storage devices 14 which are arranged adjacent to each other with the main plate portion 40 interposed therebetween.

Elastically deformable front ribs 56a are also formed on the surface of the main plate portion 40 on which the reinforcing ribs 54 are formed. For example, one pair of the front ribs 56a are provided so that the front ribs 56a is spaced apart in the vertical direction. The front rib 56a on an upper side is provided on the surface of the main plate portion 40 so that the front rib 56a extends in the lateral direction (D2 direction in the drawing) above the uppermost reinforcing rib 54, while the front rib 56a on a lower side is provided on the surface of the main plate portion 40 so that the front rib 56a extends in the lateral direction (D2 direction in the drawing) below the lowermost reinforcing rib 54. The respective front ribs 56a are provided over the whole width of the main plate portion 40 in the lateral direction (D2 direction in the drawing).

Figure 7:
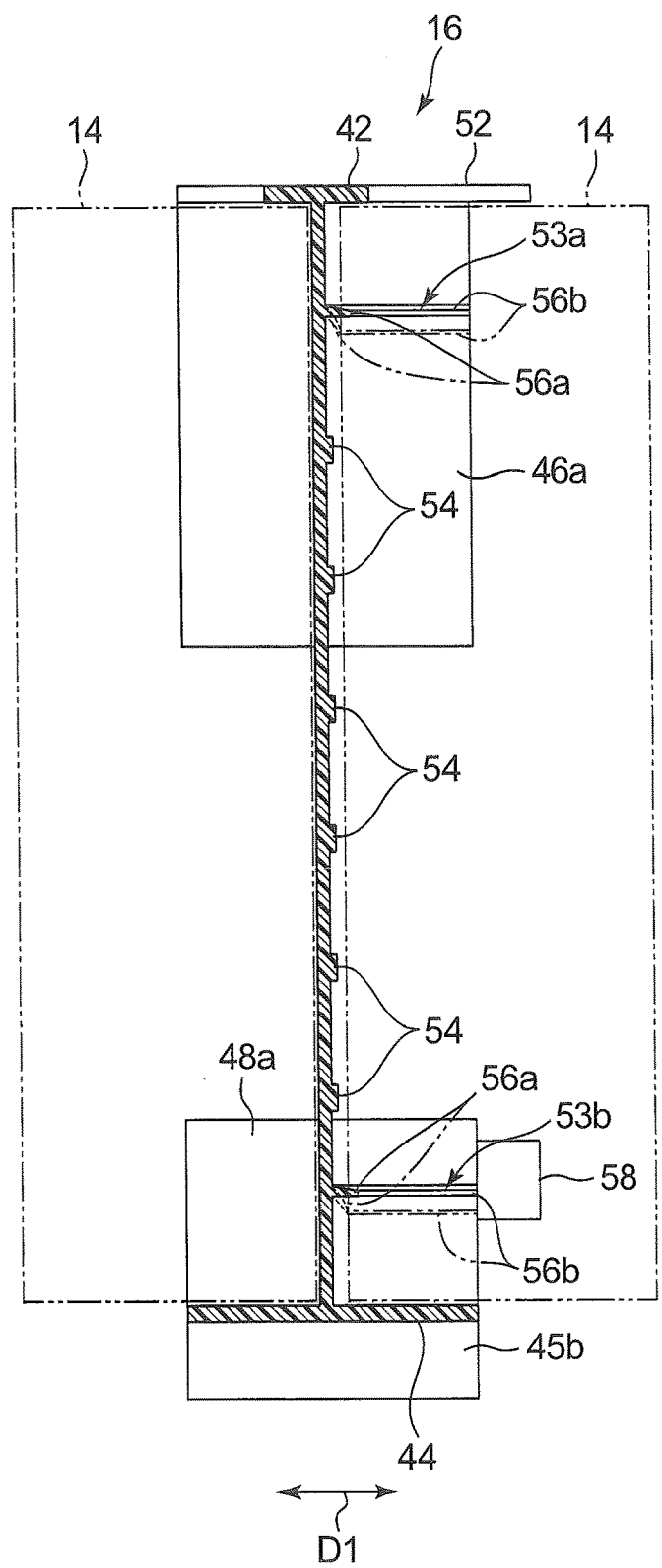
FIG. 7 is a cross-sectional view taken along a line A-A in FIG. 6.

As illustrated in FIG. 7 which is a cross-sectional view, a height (projecting amount) of the front rib 56a is larger than a height (projecting amount) of the reinforcing ribs 54. Accordingly, the electric storage device 14 can be surely brought into pressure contact with distal end portions of the front ribs 56a in a state where the electric storage devices 14 and the spacers 16 are stacked to each other. Due to such a constitution, the front ribs 56a can be surely elastically deformed as indicated by a double-dashed chain line in the drawing. In this manner, by assembling the assembled battery 10 so that the front ribs 56a are sandwiched between the main plate portion 40 and the electric storage device 14 in a state where the front ribs 56a are elastically deformed, even when a size of the electric storage device 14 in the stacking direction (D1 direction in the drawing) changes or an error occurs in the size of the electric storage device 14 in the stacking direction, it is possible to favorably maintain a state where the distal end portions of the front ribs 56a are brought into pressure contact with the electric storage device 14 by changing a deformation amount of the front ribs 56a corresponding to such a change in size or an error. Accordingly, the electric storage device 14 can be surely positioned with respect to the spacer 16 in the stacking direction (D1 direction in the drawing).

A deformation amount of the front ribs 56a changes corresponding to a force applied to the front ribs 56a in the stacking direction (D1 direction in the drawing), and a shock can be absorbed by the change in deformation amount of the front rib 56a. Accordingly, when the assembled battery 10 is used in a posture where the end plate 18a, 18b are arranged on an upper side and a lower side of the stacked body 12 respectively, that is, in a posture where the stacking direction (D1 direction in the drawing) agrees with the vertical direction, vibrations of the respective electric storage devices 14 in the vertical direction can be alleviated. In this case, it is possible to suppress damage on a bottom portion of the exterior case (not shown in the drawing) due to a weight of the electric storage devices 14.

A plurality of (two in this embodiment) front ribs 56a are provided on the same surface of the main plate portion 40. Accordingly, at the time of positioning the electric storage device 14 with respect to the surface of the main plate portion 40 on which the front ribs 56a are provided, the incline of the electric storage device 14 can be suppressed.

As illustrated in FIGS. 3 to 5, as the flange portions provided on the spacer 16, the upper flange portion 42, the lower flange portion 44, the first and second upper side flange portions 46a, 46b, and the first and second lower side flange portions 48a, 48b are provided on the main plate portion 40. All flange portions 42, 44, 46a, 46b, 48a, 48b are provided on the main plate portion 40 along a plane parallel to the stacking direction (D1 direction in the drawing).

The upper flange portion 42 is provided so as to project on both sides in the stacking direction (D1 direction in the drawing) from an upper edge portion of the main plate portion 40. The upper flange portion 42 is formed into an elongated shape which extends in the lateral direction (D2 direction in the drawing), and an enlarged-width portion 42a in which a width of the upper flange portion 42 is increased in the stacking direction (D1 direction in the drawing) is provided on a center portion of the upper flange portion 42 in the length direction. A plurality of notched portions 43 are provided on the enlarged-width portion 42a thus preventing the safety valve 24 and the liquid plug 26 mounted on the upper surface of the electric storage device 14 from interfering with the upper flange portion 42.

The lower flange portion 44 is provided so as to project on both sides in the stacking direction (D1 direction in the drawing) from a lower edge portion of the main plate portion 40. A pair of left and right projecting portions 45a, 45b is provided on both end portions in the lateral direction (D2 direction in the drawing) of a lower surface of the lower flange portion 44. A recessed groove 51c, 51d in which the binding band 50c, 50d is fitted is provided between the pair of projecting portions 45a, 45b.

The first and second upper side flange portions 46a, 46b are provided on left and right side edge portions of the main plate portion 40 respectively at portions above center portions of the left and right side edge portions in the vertical direction. The first upper side flange portion 46a is provided so as to project on both sides in the stacking direction (D1 direction in the drawing) from one side edge portion (right edge portion) of the main plate portion 40 in the lateral direction (D2 direction in the drawing), and the second upper side flange portion 46b is provided so as to project on both sides in the stacking direction (D1 direction in the drawing) from the other side edge portion (left edge portion) of the main plate portion 40. These first and second upper side flange portions 46a, 46b are arranged so as to sandwich the electric storage devices 14 from both sides in the lateral direction (D2 direction in the drawing).

A pair of upper and lower projecting portions 47a, 47b is provided on an outer surface of each of the upper side flange portions 46a, 46b. A recessed groove 51a, 51b in which the binding band 50a, 50b is fitted is provided between the pair of projecting portions 47a, 47b. A roof portion 52 which is contiguously formed with the upper flange portion 42 is provided on an upper edge portion of each of the upper side flange portions 46a, 46b. A notched portion 52a is formed on a portion of the roof portion 52 which is arranged on one end side in the stacking direction (D1 direction in the drawing) and constitutes an outer corner portion in the lateral direction (D2 direction in the drawing), and a notched portion 52b is formed on a portion of the roof portion 52 which is arranged on the other end side in the stacking direction (D1 direction in the drawing) and constitutes an inner corner portion in the lateral direction (D2 direction in the drawing). These notched portions 52a, 52b are formed so that the roof portions 52 of the spacers 16 arranged adjacent to each other do not interfere with each other.

The first and second lower side flange portions 48a, 48b are respectively formed on left and right side edge portions of the main plate portion 40 at portions below center portions of the left and right side edge portions in the vertical direction. The first lower side flange portion 48a is provided so as to project on both sides in the stacking direction (D1 direction in the drawing) from one side edge portion (right edge portion) in the lateral direction (D2 direction in the drawing) of the main plate portion 40, and the second lower side flange portion 48b is provided so as to project on both sides in the stacking direction (D1 direction in the drawing) from the other side edge portion (left edge portion) of the main plate portion 40. These first and second lower side flange portions 48a, 48b are arranged so as to sandwich the electric storage device 14 from both sides in the lateral direction (D2 direction in the drawing).

Projecting portions 49 are provided on outer surfaces of the respective lower side flange portions 48a, 48b respectively. An engaging recessed portion 58 is provided on one end surface of each projecting portion 49 in the stacking direction (D1 direction in the drawing), and an engaging recessed portion 59 is provided on the other end surface of each projecting portion 49 in the stacking direction (see FIG. 5). In a state where the assembled battery 10 is assembled, with respect to each two spacers 16 arranged adjacent to each other in the stacking direction (D1 direction in the drawing), the engaging projecting portion 58 provided on one spacer 16 is engaged with the engaging recessed portion 59 formed on the other spacer 16 and hence, the positioning between the spacers 16 can be performed.

As illustrated in FIGS. 3 and 6, the first upper side flange portion 46a includes a pressing portion 53a for pressing the electric storage device 14 in the lateral direction (D2 direction in the drawing) toward the second upper side flange portion 46b. The first lower side flange portion 48a includes a pressing portion 53b for pressing the electric storage device 14 in the lateral direction (D2 direction in the drawing) toward the second lower side flange portion 48b. Each pressing portion 53a, 53b includes an elastically deformable side rib 56b which projects from a surface of the first upper side flange portion 46a or the first lower side flange portion 48a which faces the electric storage device 14. The side ribs 56b are in contact with the electric storage device 14 in a deformed state.

The side ribs 56b are provided in an extending manner in the stacking direction (D1 direction in the drawing). One end portion of each side rib 56b in the length direction is provided so that one end portion is connected to one end portion of the front rib 56a in the length direction at a corner portion defined between the side flange portion 46a, 48a on which the side rib 56b is provided and the main plate portion 40. In this manner, by forming each front rib 56a and the corresponding side ribs 56b integrally, the spacer 16 can be easily formed. Further, each front rib 56a is provided over the whole width of the main plate portion 40 in the lateral direction (D2 direction in the drawing), and each side rib 56b is provided over the whole width of the side flange portion 46a, 48a in the stacking direction (D1 direction in the drawing). Accordingly, the intrusion of a foreign material through between the spacer 16 and the electric storage device 14 can be effectively suppressed by the front ribs 56a and the side ribs 56b provided in the above-mentioned manner.

As illustrated in FIG. 4, support portions 55a, 55b are provided on surfaces of the second upper side flange portion 46b and the second lower side flange portion 48b which face the electric storage device 14. The support portions 55a, 55b are in contact with the electric storage device 14 to which the side rib 56b is pressed on an opposite side with respect to the side rib 56b in the lateral direction (D2 direction in the drawing). The respective support portions 55a, 55b are flat surfaces which can be brought into face contact with the electric storage device 14. Due to such a constitution, the electric storage device 14 can be stably supported by the support portions 55a, 55b at an opposite side with respect to the pressing portions 53a, 53b. Further, the electric storage device 14 is brought into face contact with the flat support portions 55a, 55b and hence, the electric storage device 14 can be positioned accurately without being inclined.

Figure 8:
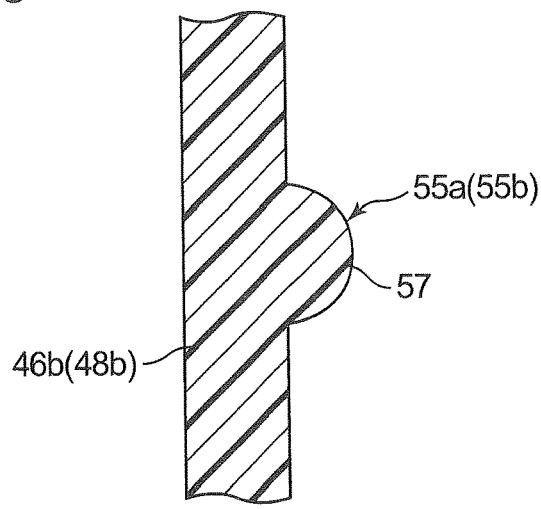
FIG. 8 is a cross-sectional view showing a modification of a support portion of the spacer shown in FIG. 3.

As exemplified in FIG. 8, the support portion 55a, 55b may be a projection 57 which projects from a surface of the second upper side flange portion 46b and/or a surface of the second lower side flange portion 48b which face the electric storage device 14. In this case, the projection 57 is interposed between the second upper side flange portion 46b and/or the second lower side flange portion 48b and the electric storage device 14 so that a space can be formed therebetween. Although it is preferable to provide one or more projections 57 on each of flange portions 46b, 48b, one projection 57 may be provided on any one of flange portion 46b or 48b. By providing the plurality of projections 57 having the same shape on the same surface, the electric storage device 14 can be positioned without being inclined by these projections 57. The projection 57 is configured so that the projection 57 is brought into contact with the electric storage device 14 in a state where the projection 57 is deformed and a deformation amount of the projection 57 is smaller than a deformation amount of the side rib 56b provided on the pressing portion 53a, 53b or in a state where the projection 57 is not deformed. Due to such a constitution, favorable positioning accuracy of the electric storage device 14 can be acquired by the support portions 55a, 55b. Although a specific shape of the projection 57 is not limited, the projection 57 may have a semispherical shape e.g., as illustrated in FIG. 8.

Figure 9:
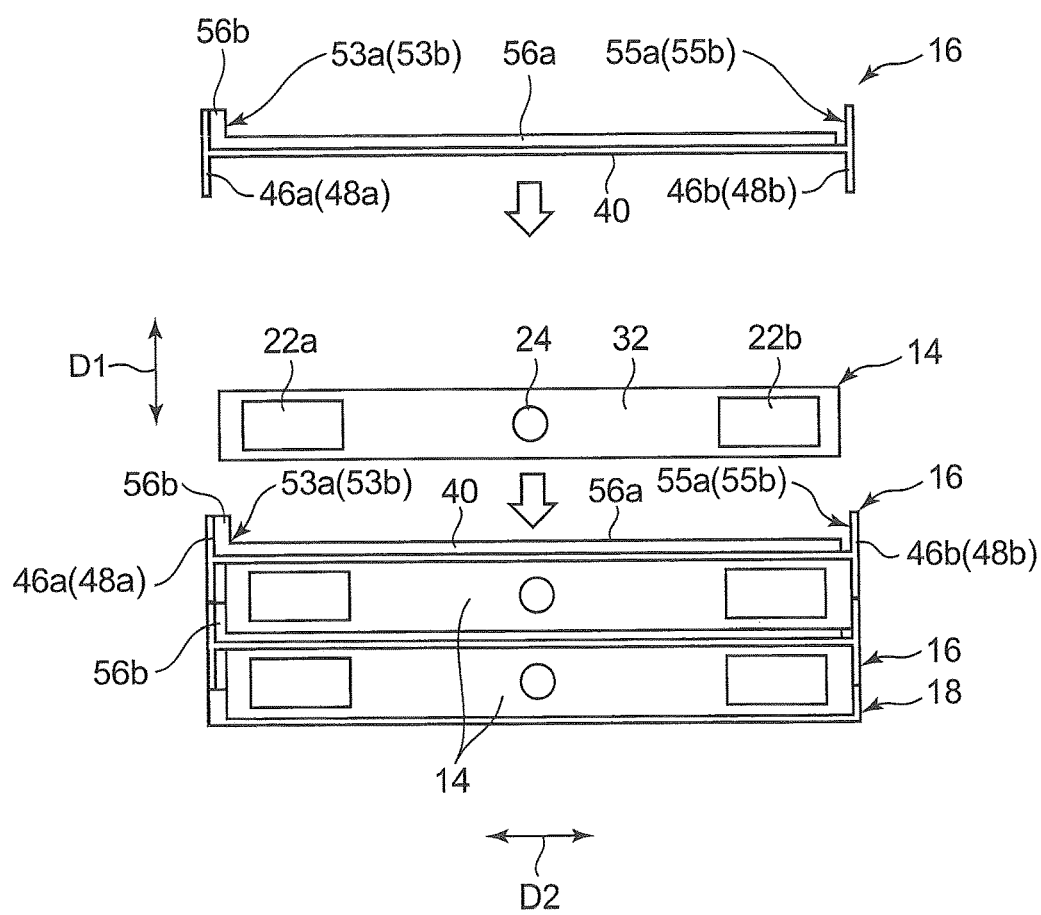
FIG. 9 is a view showing steps of assembling the electric storage apparatus shown in FIG. 1.

As schematically shown in FIG. 9, in assembling the assembled battery 10, the electric storage device 14 and the spacer 16 are alternately stacked in the stacking direction (D1 direction in the drawing). In a state where the side ribs 56b are not deformed, distances in the lateral direction (D2 direction in the drawing) between the distal ends of the side ribs 56b of the first side flange portion 46a, 48a and the support portions 55a, 55b of the second side flange portions 46b, 48b are set equal to or smaller than a width of the electric storage device 14. Accordingly, when the electric storage device 14 is arranged on the main plate portion 40 of the spacer 16, the electric storage device 14 is inserted between the first side flange portions 46a, 48a and the second side flange portions 46b, 48b while elastically deforming the side ribs 56b of the first side flange portion 46a, 48a so that the distances between the distal ends of the side ribs 56b and the support portions 55a, 55b of the second side flange portions 46b, 48b are expanded (see a double-dashed chain line in FIG. 6). Due to a restoring force of the side ribs 56b which is generated by the elastic deformation of the side ribs 56b, the pressing portions 53a, 53b bias the electric storage device 14 in the lateral direction (D2 direction in the drawing) toward the support portions 55a, 55b. Each electric storage device 14 is brought into pressure contact with the support portions 55a, 55b so that the electric storage device 14 is positioned in the lateral direction (D2 direction in the drawing).

All spacers 16 which constitute the stacked body 12 are stacked to each other so that all spacers are positioned while being directed in the same direction. Due to such a constitution, the pressing portions 53a, 53b of all spacers 16 are arranged parallel to each other in the stacking direction (D1 direction in the drawing) on one side in the lateral direction (D2 direction in the drawing), while the support portions 55a, 55b of all spacers 16 are arranged parallel to each other in the stacking direction (D1 direction in the drawing) on the other side in the lateral direction (D2 direction in the drawing). The support portions 55a, 55b are in contact with the electric storage device 14 without being deformed and hence, the positions of all support portions 55a, 55b in the lateral direction (D2 direction in the drawing) can be approximately completely aligned with each other. Accordingly, the positions of all electric storage devices 14 in the lateral direction (D2 direction in the drawing) which are positioned by these support portions 55a, 55b can be aligned with each other.

Figure 10:
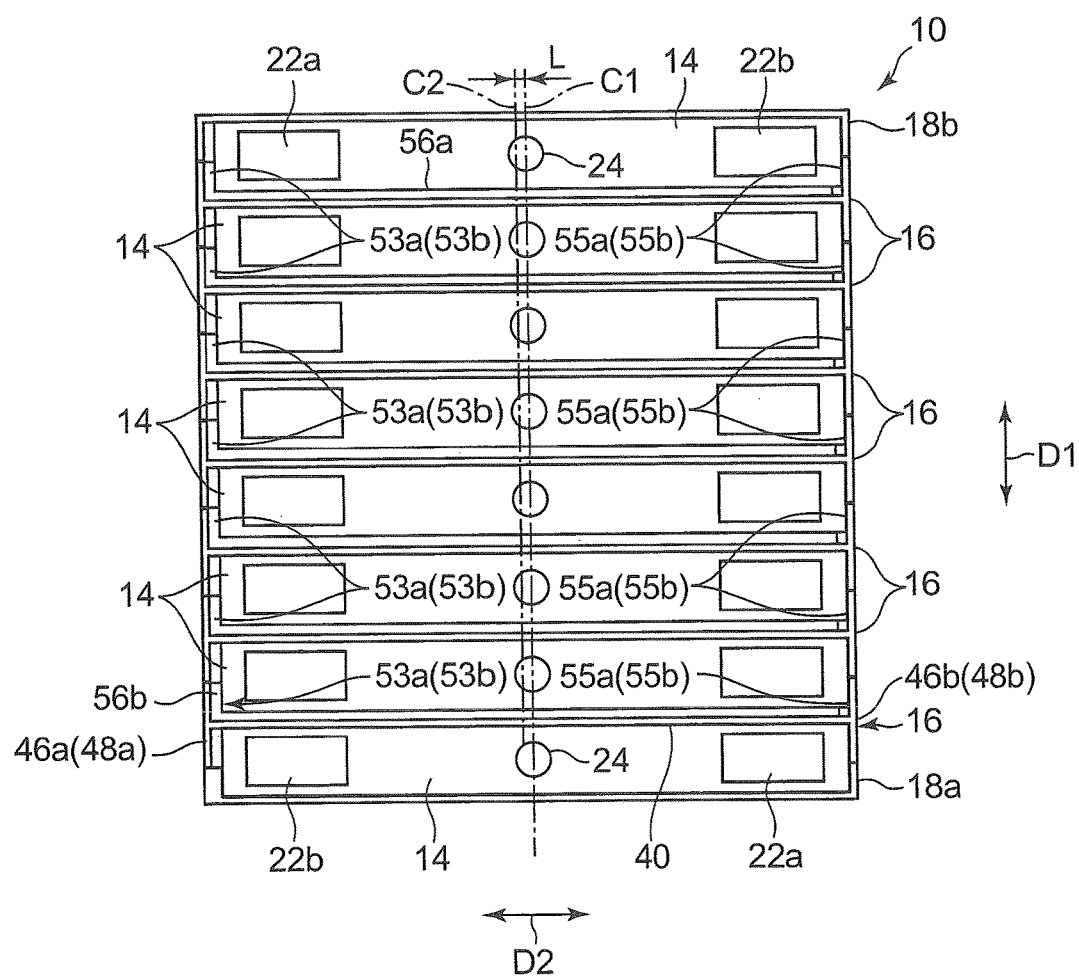
FIG. 10 is a view showing the electric storage apparatus in an assembled state.

With respect to the positions in the lateral direction (D2 direction in the drawing) in a state where the electric storage devices 14 are assembled to each other as illustrated in FIG. 10, the center C1 of the electric storage device 14 is offset toward a second side flange portion side by an approximately fixed distance L with respect to the center C2 of the spacer 16 (the center between opposite surfaces of the first side flange portions 46a, 48a to the electric storage device 14 and opposite surfaces of the second side flange portions 46b, 48b to the electric storage device 14).

Figure 11:
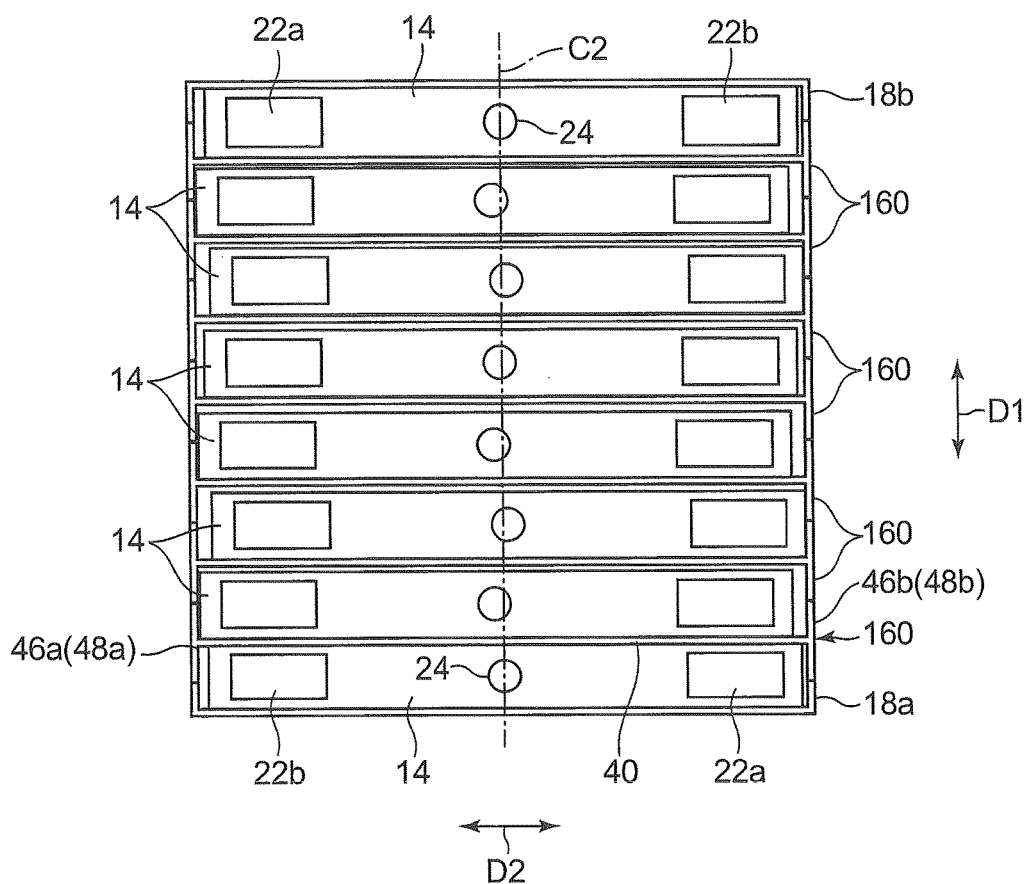
FIG. 11 is a view showing an assembled state in the case where spacers according to a comparison example are used.

On the other hand, in a conventional example shown in FIG. 11, elastically deformable side ribs 56b are not provided on side flange portions 46a, 48a, 46b, 48b of a spacer 160 and hence, to surely insert the electric storage device 14 between the first side flange portions 46a, 48a and the second side flange portions 46b, 48b, it is necessary to set a distance between both flange portions in the lateral direction (D2 direction in the drawing) slightly larger than a size of an electric storage device 14 in consideration of a size error. Accordingly, a clearance is generated between the electric storage device 14 and the first side flange portions 46a, 48a as well as between the electric storage device 14 and the second side flange portions 46b, 48b and hence, the electric storage devices 14 and terminals 22 (22a, 22b) cannot be positioned in the lateral direction (D2 direction in the drawing) with high accuracy.

Accordingly, in the conventional example shown in FIG. 11, there may be a case where the terminals 22 which are displaced from each other in the lateral direction (D2 direction in the drawing) are connected to each other through a bus bar (not shown in the drawings). In such a case, a defect may occur in welding the bus bar to the terminals 22. Assuming a case where the side ribs 56b are provided on both the first side flange portion 46a, 48a and the second side flange portion 46b, 48b, the substantially same positioning displacement can occur.

To the contrary, in this embodiment, all electric storage devices 14 can be positioned substantially accurately in the lateral direction (D2 direction in the drawing) and hence, both terminals 22 (22a, 22b) of all electric storage devices 14 can be positioned accurately. Accordingly, in the case where the terminals 22 of the plurality of stacked electric storage devices 14 are connected to each other through one bus bar (not shown in the drawings), the bus bar can be properly welded to the respective terminals 22 which are positioned accurately.

In a state where the assembled battery 10 is assembled, the side ribs 56b are sandwiched between the first side flange portions 46a, 48a and the electric storage device 14 so as to be elastically deformed as indicated by a double-dashed chain line in FIG. 6. That is, in the assembled state, distances in the lateral direction (D2 direction in the drawing) between the distal ends of the side ribs 56b of the first side flange portions 46a, 48a and the support portions 55a, 55b of the second side flange portions 46b, 48b are always equal to a width of the electric storage device 14. Accordingly, even when a size of the electric storage device 14 is changed due to an expansion, a shrinkage or the like of the electric storage device 14 accompanying with charging/discharging power or even when the electric storage device 14 involves an dimensional error, changing in deformation amount of the side ribs 56b corresponding to these factors can maintain a state where the distal end portions of the side ribs 56b are brought into pressure contact with the electric storage device 14. Accordingly, the electric storage device 14 can be surely positioned in the lateral direction (D2 direction in the drawing) with respect to the spacer 16 so that rattling of the electric storage device 14 can be suppressed.

The first upper side flange portion 46a and the first lower side flange portion 48a having the side ribs 56b respectively are arranged on the same surface. Accordingly, the plurality of (two in this embodiment) side ribs 56b are arranged on the same surface. Due to such a constitution, it is possible to suppress the incline of the electric storage device 14 with respect to the side flange portions 46*a*, 48*a* having the side rib 56*b* respectively.

As illustrated in FIG. 6, a space portion S is formed by interposing the side ribs 56*b* between the first upper side flange portion 46*a* and the electric storage device 14 and between the first lower side flange portion 48*a* and the electric storage device 14. Accordingly, when the first upper side flange portion 46*a* and/or the first lower side flange portion 48*a* are/is interposed between the electric storage device 14 and the circuit board 99, the space portion S performs a heat insulating function and hence, the heat conduction between the electric storage device 14 and the circuit board 99 can be suppressed. Further, by arranging the circuit board 99 and the electric storage device 14 in a spaced-apart manner with the space portion S for formed therebetween, the occurrence of a liquid junction between the circuit board 99 and the electric storage device 14 can be suppressed.

Next, a cross-sectional shape of the side rib 56*b* and a modification of the cross-sectional shape of the side rib 56*b* are explained by reference to FIG. 12 and FIG. 13A to FIG. 13C. In FIG. 12 and FIG. 13A to FIG. 13C, the side rib 56*b* which is provided in a projecting manner on an inner surface 79 of the first upper side flange portion 46*a* (a surface of the first upper side flange portion 46*a* which faces the electric storage device 14) is illustrated. A cross-sectional shape of the side rib 56*b* which is provided in a projecting manner on the first lower side flange portion 48*a* and a cross-sectional shape of the front rib 56*a* which is projected in a projecting manner on the main plate portion 40 are substantially equal to the cross-sectional shape of the side rib 56*b* which is projected on the inner surface 79 of the first upper side flange portion 46*a*.

Figure 12:
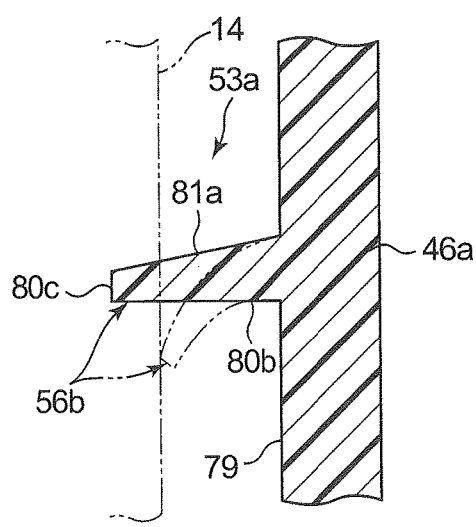
FIG. 12 is a cross-sectional view showing a cross-sectional shape of a side rib of the spacer.

As illustrated in FIG. 12, the side rib 56*b* according to this embodiment includes a pair of raised surface portions 80*a*, 80*b* which are raised from the inner surface 79 (hereinafter referred to as "base face") of the side flange portion 46*a*. The upper raised surface portion 80*a* is formed in a downwardly inclined manner toward a distal end thereof, while the lower raised surface portion 80*b* is formed approximately along the horizontal direction, that is, approximately orthogonal to the base face 79. Due to such a constitution, the pair of raised surface portions 80*a*, 80*b* is arranged so as to gradually approach each other toward the distal ends thereof. Further, the side rib 56*b* includes an end surface 80*c* which connects the distal ends of the pair of raised surface portions 80*a*, 80*b*. The end surface 80*c* is arranged approximately along the vertical direction, that is, approximately parallel to the base face 79. Accordingly, the side rib 56*b* has an elongated trapezoidal cross-sectional shape.

In this manner, the side rib 56*b* has a cross-sectional shape which is gradually narrowed toward a distal end thereof and is inclined downwardly and hence, when the electric storage device 14 is brought into pressure contact with the distal end portion of the side rib 56*b*, the side rib 56*b* is easily elastically deformable so that the side rib 56*b* is bent downwardly (see a double-dashed chain line in FIG. 12).

Figure 13A:
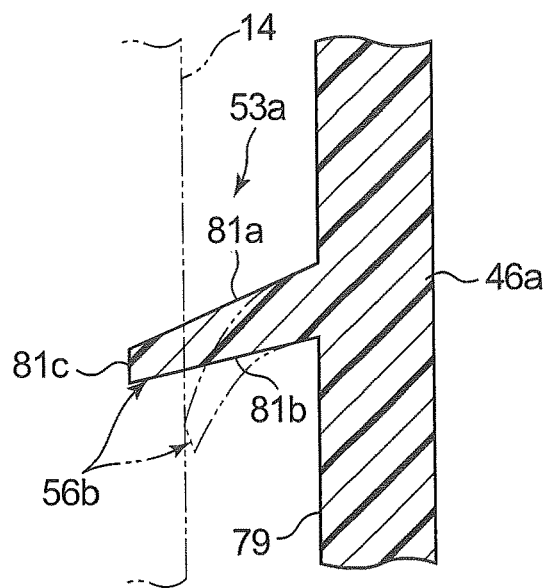
FIG. 13A is a cross-sectional view showing a modification of the side rib.
Figure 13B:
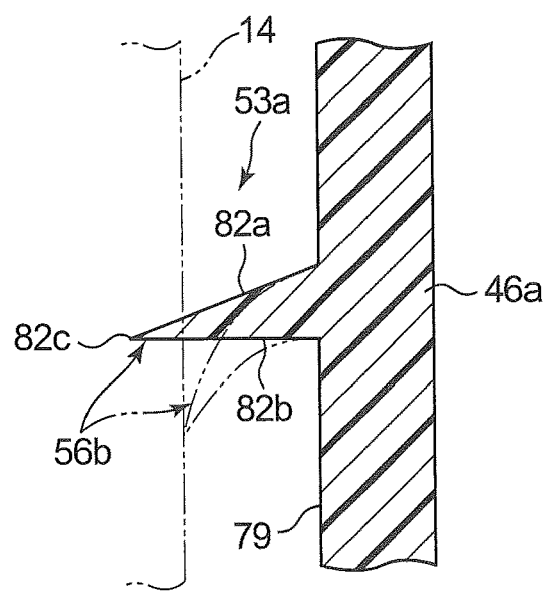
FIG. 13B is a cross-sectional view showing a modification of the side rib.
Figure 13C:
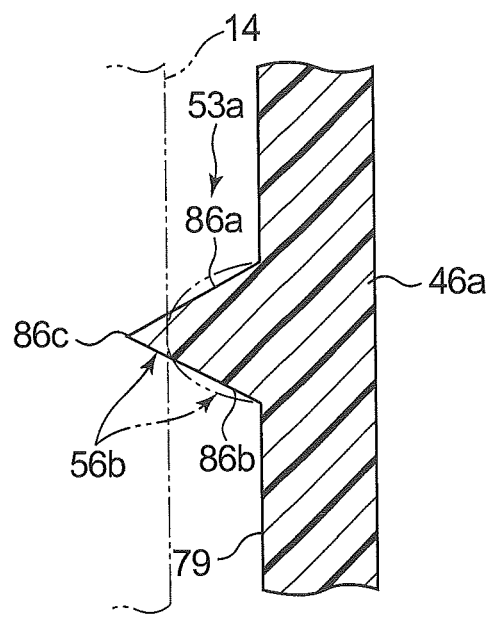
FIG. 13C is a cross-sectional view showing a modification of the side rib.

Then, modifications of the cross-sectional shape of the side rib 56*b* shown in FIG. 13A to FIG. 13C are explained.

To compare an example shown in FIG. 13A with the example shown in FIG. 12, the example shown in FIG. 13A has the same cross-sectional shape with respect to the fact that a side rib 56*b* includes a pair of raised surface portions 81*a*, 81*b* and an end surface 81*c*. However, the example shown in FIG. 13A differs from the example shown in FIG. 12 with respect to the fact that not only the upper raised surface portion 81*a* but also the lower raised surface portion 81*b* are formed in a downwardly inclined manner toward distal ends thereof. Due to such a constitution, the side rib 56*b* can be more easily bent downwardly (see a double-dashed chain line in FIG. 13A).

To compare an example shown in FIG. 13B with the example shown in FIG. 12, the example shown in FIG. 13B has the same cross-sectional shape with respect to the fact that an upper raised surface portion 82*a* is inclined downwardly toward a distal end thereof, and the lower raised surface portion 82*b* is formed approximately along the horizontal direction. However, the example shown in FIG. 13B differs from the example shown in FIG. 12 with respect to the fact that a distal end 82*c* of a side rib 56*b* is not formed into a planar shape but is formed into a linear shape so that a side rib 56*b* has a triangular cross-sectional shape. Due to such a constitution, the elastic deformation of the distal end portion of the side rib 56*b* can be further increased (see a double-dashed chain line in FIG. 13B).

In an example shown in FIG. 13C, an upper raised surface portion 86*a* is inclined downwardly toward a distal end thereof, a lower raised surface portion 86*b* is inclined upwardly toward a distal end thereof, and a distal end 86*c* of a side rib 56*b* is formed into a linear shape. Accordingly, the side rib 56*b* has an isosceles triangular cross-sectional shape. Due to such a constitution, the side rib 56*b* is elastically deformed so that the side rib 56*b* is crushed in the direction orthogonal to a surface 79 which faces the electric storage device 14 (see a double-dashed chain line in FIG. 13C) whereby a relatively large restoring force can be applied to the electric storage device 14.

Second Embodiment

Figure 14:
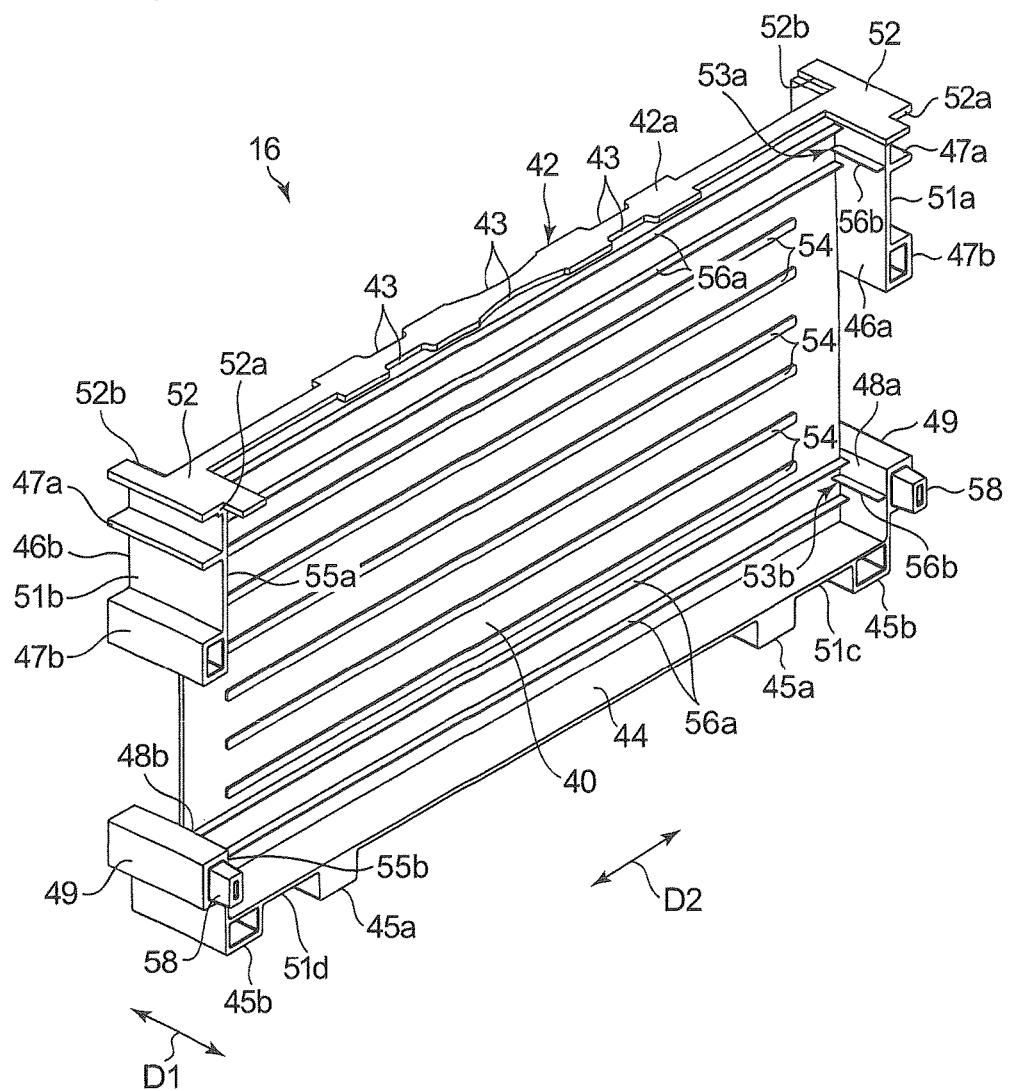
FIG. 14 is a perspective view showing a spacer of an electric storage apparatus according to a second embodiment of the present invention.

Next, the constitution of a spacer 16 of an electric storage apparatus according to the second embodiment of the present invention is explained by reference to FIG. 14. Here, the detailed explanation of the constitutions of the spacer 16 according to the second embodiment which are identical with the corresponding constitutions of the spacer according to the first embodiment is omitted. In FIG. 14, parts of the spacer 16 having functions identical with the functions of the corresponding parts of the spacer of the first embodiment are given the same symbols shown in FIG. 3.

In the spacer 16 shown in FIG. 14, a pair of upper and lower front ribs 56*a* is provided on an upper portion of the main plate portion 40, and a pair of upper and lower front ribs 56*a* is also provided on a lower portion of the main plate portion 40. That is, compared with the above-mentioned embodiment shown in FIG. 3 and the like, the number of front ribs 56*a* is increased twice so that the number of front ribs 56*a* is larger than the number of side ribs 56*b* in the embodiment shown in FIG. 14. Accordingly, a load is distributed more effectively in the front ribs 56*a* than in the side ribs 56*b* and hence, the front ribs 56*a* are less deformable than the side ribs 56*b*.

Due to such a constitution, it is possible to suppress the excessive deformation of the front ribs 56*a* when a large force is applied to the main plate portion 40 in the stacking direction (D1 direction in the drawing). Accordingly, a rigidity of the assembled battery 10 against a force in the stacking direction (D1 direction in the drawing) can be enhanced. On the other hand, with respect to the side flange portions 46*a*, 48*a* with which a circumstance where a force is applied is less likely to occur, only a relatively small force is basically applied to the side flange portions 46*a*, 48*a* in the lateral direction (D2 direction in the drawing), and the side ribs 56b are relatively easily deformable. Accordingly, the spacer 16 according to this embodiment can preferably exhibit the above-mentioned positioning effect and the like.

The constitution which makes the deformation of the front ribs 56a more difficult than the deformation of the side ribs 56b is not limited to the constitution in which the number of front ribs 56a is set larger than the number of side ribs 56b. Such a constitution may be realized by e.g., making a cross-sectional shape of the front rib 56a a shape by which the deformation is more difficult than the deformation of the side rib 56b. In such a case, e.g., by providing the front ribs 56a with a cross-sectional shape shown in FIG. 13C and by providing the side rib 56b with a cross-sectional shape shown in FIG. 12, FIG. 13A or FIG. 13B, it is possible to make the deformation of the front rib 56a more difficult than the deformation of the side rib 56b.

In the spacer 16 shown in FIG. 14, the front ribs 56a and the side ribs 56b are separately formed from each other. Accordingly, the front rib 56a and the side ribs 56b are individually deformable so that the deformation of both ribs 56a, 56b can be enhanced. Due to such a constitution, the electric storage device 14 can be positioned with high accuracy in the stacking direction (D1 direction in the drawing) as well as in the lateral direction (D2 direction in the drawing).

The front ribs 56a are provided over the whole width of the main plate portion 40 in the lateral direction (D2 direction in the drawing), and the side ribs 56b are provided over the whole width of the side flange portions 46a, 48a in the stacking direction (D1 direction in the drawing). At boundary portions between the main plate portion 40 and the side flange portions 46a, 48a, one end portions of the front ribs 56a in the length direction and one end portion of the side rib 56b in the length direction are arranged at positions different from each other. By providing the front ribs 56a and the side ribs 56b in this manner, the intrusion of a foreign material through between the spacer 16 and the electric storage device 14 can be effectively suppressed by the front ribs 56a which extend over the whole width of the main plate portion 40 and the side ribs 56b which extend over the whole width of the side flange portions 46a, 48a while avoiding the interference between both ribs 56a, 56b which are separately formed from each other.

Third Embodiment

Next, the constitution of a spacer 16 of an electric storage apparatus according to the third embodiment of the present invention is explained by reference to FIG. 15. The third embodiment differs from the second embodiment only with respect to the constitution of side ribs of pressing portions. Other constitutions of the third embodiment are substantially equal to the corresponding constitutions of the second embodiment and hence, the detailed explanation of the constitutions in common with the constitutions of the second embodiment is omitted. Further, in FIG. 15, parts of the spacer 16 having the functions identical with the corresponding parts of the spacer of the second embodiment are given the same symbols shown in FIG. 3.

Figure 15:
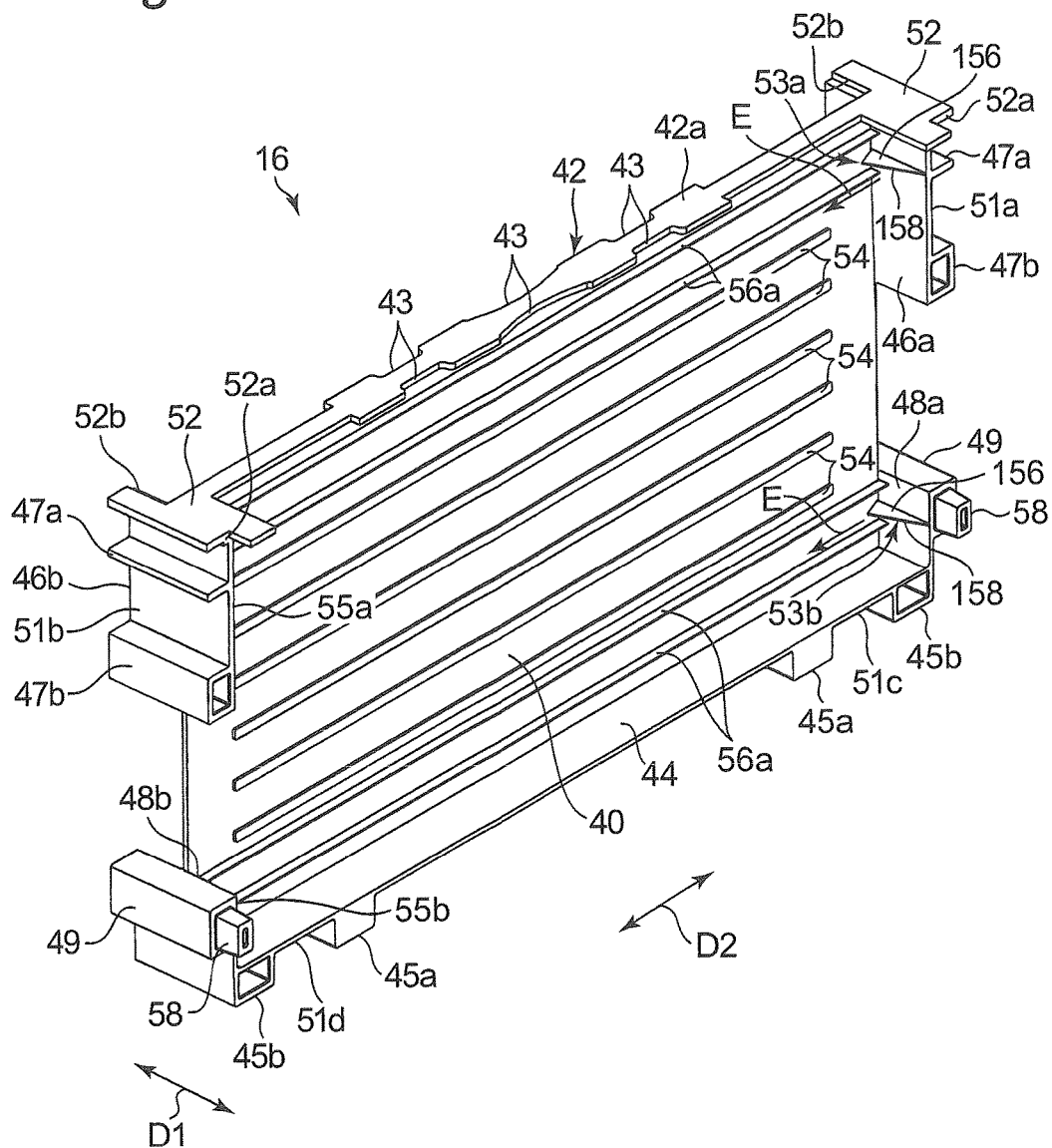
FIG. 15 is a perspective view showing a spacer of an electric storage apparatus according to a third embodiment of the present invention.

As illustrated in FIG. 15, a side rib 156 of each pressing portion 53a, 53b has a triangular shape as viewed in a plan view. A cross-sectional shape of the side rib 156 is not particularly limited and the side rib 156 may have the substantially same cross-sectional shape as the side rib 56b shown in FIG. 12 or any one of FIG. 13A to FIG. 13C. A distal end 158 of the side rib 156 extends toward a main plate portion 40 side in the stacking direction (D1 direction in the drawing) and toward a support portion 55a, 55b side in an inclined manner. Due to such an incline of the distal end 158, a shape of the side rib 156 is for need so that an amount of projection of the side rib 156 toward a support portion 55a, 55b side in the lateral direction (D2 direction in the drawing) is increased as the distal end 158 approaches the main plate portion 40. Due to such a constitution, when the electric storage device 14 is arranged on the main plate portion 40 of the spacer 16, an end portion of the electric storage device 14 on a pressing portion 53a, 53b side is brought into contact with the distal end 158 of the side rib 156. The distal end 158 of the side rib 156 functions as a guide portion which guides the electric storage device 14 in the lateral direction (D2 direction in the drawing, that is, in the direction toward the support portion 55a, 55b (direction E in the drawing).

In a state where the side rib 156 is not deformed, in the lateral direction (D2 direction in the drawing), a distance between a portion which is closest to the support portion 55a and a support portion 55b in the distal end 158 of the side rib 156 and the support portions 55a, 55b is equal to or smaller than a width of the electric storage device 14. Accordingly, when the electric storage device 14 is inserted between the distal ends 158 of the side ribs 156 and the support portions 55a, 55b and is pushed toward the main plate portion 40, the side ribs 156 are sandwiched between the first side flange portions 46a, 48a and the electric storage device 14 thus being elastically deformed. The side ribs 156 are interposed between the electric storage device 14 and the side flange portions 46a, 48a in a deformed state and hence, the pressing portions 53a, 53b bias the electric storage device 14 toward the support portions 55a, 55b using an elastic force of the side ribs 156. Accordingly, the electric storage device 14 can be positioned in the lateral direction (D2 direction in the drawing) with high accuracy using the support portions 55a, 55b and, at the same time, movements of the electric storage device 14 can be suppressed.

In the third embodiment, a shape of the side rib 156 is not limited to the shape shown in FIG. 15 and the distal end 158 of the side rib 156 may be a curved portion in which an amount of projection of the distal end 158 toward the support portion 55a, 55b side is exponentially increased as the distal end 158 approaches the main plate portion 40.

Although the present invention has been explained by taking the above-mentioned embodiments as examples, the present invention is not limited to the above-mentioned embodiments.

For example, in the present invention, a cross-sectional shape of the side rib 56b, 156 and a cross-sectional shape of the front rib 56a are not limited to shapes shown in FIG. 12 and FIG. 13A to FIG. 13C, and various shapes can be adopted provided that the side rib 56b, 156 and the front rib 56a are deformable when the side rib 56b, 156 and the front rib 56a are brought into pressure contact with the electric storage device 14. Specifically, the spacer 16 of the first or second embodiment may adopt the constitution in which an extension portion is added to the distal end of the side rib 56b and/or the distal end of the front rib 56a. Further, the side rib 56b, 156 and the front rib 56a may be formed of an elastically deformable rib having a semicircular cross-sectional shape. In this case, a stress applied to the distal end of the rib can be effectively distributed to the whole rib. However, it is preferable to use a rib having a shape with which the rib easily buckles such as the ribs 56b shown in FIG. 12 and FIG. 13A to FIG. 13C from a viewpoint that these ribs are easily deformed.

In the above-mentioned embodiments, the explanation has been made with respect to the case where the ribs are provided on the main plate portion 40 and the side flange portions 46a, 48a as projecting portions. However, in the present invention, the projecting portions may be provided using members other than such ribs. For example, one large projecting portion which projects from the whole surface or a large part of a surface of the main plate portion 40 or the side flange portion 46a, 48a which faces the electric storage device 14 may be provided. Alternatively, a plurality of projecting portions may be provided on the whole surface of the main plate portion 40 or on the whole surface of the side flange portion 46a, 48a in a scattered manner.

In the above-mentioned embodiments, the explanation has been made with respect to the case where the space portion S is formed between the side flange portions 46a, 48a and the electric storage device 14 as illustrated in FIG. 6. However, in the present invention, when a large-sized projecting portion is provided on the whole surface of the side flange portion 46a, 48a, the above-mentioned space portion S may not be necessarily formed.

In the above-mentioned embodiments, the explanation has been made with respect to the constitution in which two side ribs 56b, 156 and two or four front ribs 56a are provided for every spacer 16. However, in the present invention, the number of side ribs 56b, 156 and the number of front ribs 56a are not particularly limited.

In the above-mentioned embodiments, the explanation has been made with respect to the constitution in which the side rib 56b, 156 and the front rib 56a are elastically deformable. However, in the present invention, plastically deformable projecting portions may be provided on the flange portions or the main plate portion in place of the elastically deformable projecting portions. Even when the projecting portions are plastically deformed, portions of the projecting portions are elastically deformed and hence, a biasing force of the projecting portions can be applied to the electric storage device 14.

In the above-mentioned embodiments, the explanation has been made with respect to the case where the reinforcing ribs 54 which serve as the third ribs are provided on the main plate portion 40. However, in the present invention, the third ribs may be provided only on the flange portions, or may be provided on both the main plate portion and the flange portions.

In the above-mentioned embodiments, the explanation has been made with respect to the case where the upper side flange portion 46 (46a, 46b) and the lower side flange portion 48 (48a, 48b) are arranged parallel to the stacking direction (D1 direction in the drawing), and the main plate portion 40 is arranged parallel to the lateral direction (D2 direction in the drawing) orthogonal to the stacking direction. However, in the present invention, the side flange portions 46, 48 may be arranged in an inclined manner with respect to the stacking direction (D1 direction in the drawing), or the main plate portion 40 may be arranged in an inclined manner with respect to the lateral direction (D2 direction in the drawing).

The present invention is not limited to the assembled battery in which the plurality of electric storage devices are stacked, and is also applicable to an electric storage apparatus which includes only one electric storage device.

What is claimed is:

1. An electric storage apparatus comprising:
 a plurality of insulation frames; and
 a plurality of electric storage devices stacked in a first direction with the plurality of insulation frames interposed therebetween, each of the electric storage devices comprising a lid body on which a terminal is disposed,
 wherein each of the insulation frames comprises:
  a main plate portion which is in contact with an electric storage device of the plurality of electric storage devices in the first direction;
  a first flange portion which is provided at one end portion of the main plate portion in a second direction orthogonal to the first direction and parallel to the lid body, the first flange portion including a pressing portion which includes a projecting portion projecting from a surface facing, in the second direction, the electric storage device to be pressed on the electric storage device; and
  a second flange portion which is provided at the other end portion of the main plate portion in the second direction, the second flange portion including a support portion which is in contact, in the second direction, with the electric storage device;
 wherein the projecting portion comprises a rib projecting toward and abutting against the electric storage device,
 wherein the support portion comprises a flat surface which contacts the electric storage device, and
 wherein each of the pressing portions is arranged on a first side of the electric storage apparatus in the second direction and each of the support portions is arranged on a second side of the electric storage apparatus in the second direction.

2. The electric storage apparatus according to claim 1, wherein the plurality of the insulation frames are stacked with the electric storage device interposed therebetween, and
 the support portions of the plurality of the insulation frames are arranged in a direction orthogonal to the main plate portions.

3. The electric storage apparatus according to claim 1, wherein the plurality of the electric storage devices are stacked with the main plate portion interposed therebetween.

4. The electric storage apparatus according to claim 1, wherein the first flange portion is interposed between the electric storage device and a circuit board.

5. The electric storage apparatus according to claim 1, wherein a cross-sectional shape of the rib comprises a shape which is gradually tapered toward a distal end thereof.

6. The electric storage apparatus according to claim 1, wherein the projecting portion has a shape in which a projecting amount of the projecting portion toward the support portion in the second direction is increased as the projecting portion approaches the main plate portion.

7. The electric storage apparatus according to claim 1, wherein a deformable projecting portion is provided on a surface of the main plate portion which faces the electric storage device.

8. The electric storage apparatus according to claim 7, wherein the projecting portion of the main plate portion is provided to be less deformable than the projecting portion of the first flange portion.

9. The electric storage apparatus according to claim 7, wherein the rib comprises a deformable first rib,
 the projecting portion of the main plate portion comprises a deformable second rib, and
 the first rib and the second rib are provided so that end portions of the first and second ribs in a length direction are joined to each other.

10. The electric storage apparatus according to claim 7, wherein the rib comprises a deformable first rib, the projecting portion of the main plate portion comprises a deformable second rib, and the first rib and the second rib are separately formed from each other.

11. The electric storage apparatus according to claim 10, wherein at a boundary portion between the main plate portion and the first flange portion, one end portion of the first rib in a length direction and one end portion of the second rib in a length direction are arranged at positions different from each other.

12. The electric storage apparatus according to 9, wherein a third rib is provided on a surface of the main plate portion or the first flange portion which faces the electric storage device, and a height of the deformable second or first rib is higher than that of the third rib.

13. The electric storage apparatus according to claim 1, wherein a plurality of projecting portions are formed on the surface.

14. The electric storage apparatus according to claim 1, wherein the electric storage device comprises a terminal surface, and a side surface connected to the terminal surface, and the rib projects toward and abuts against the side surface of the electric storage device.

15. A spacer for a battery module, the spacer comprising:
a main plate portion for contacting a long side surface of a battery of the battery module;
a first flange portion formed at a first end of the main plate portion, the first flange portion comprising:
a plate portion connected to the first end of the main plate portion and perpendicular to the main plate portion, and including a side wall facing a first short side surface of the battery; and
a rib formed on the side wall and projecting toward and abutting against the short side surface of the battery; and
a second flange portion formed at a second end of the main plate portion opposite the first end, the second flange portion comprising:
a plate portion connected to the second end of the main plate portion and perpendicular to the main plate portion, and including a side wall comprising a flat surface abutting against a second short side surface of the battery opposite the first short side surface, the flat surface being formed opposite the rib.

16. The electric storage apparatus according to claim 1, wherein a center of the electric storage device is offset toward the second flange portion with respect to a center of the main plate portion.

17. The electric storage apparatus according to claim 1, wherein the flat surface extends in the first direction and a third direction perpendicular to the first and second directions, and contacts the electric storage device.

18. The electric storage apparatus according to claim 1, wherein the support portion of the second flange portion does not include a rib.

19. An electric storage apparatus comprising:
a plurality of electric storage devices stacked in a first direction, each of the electric storage devices comprising a lid body on which a terminal is disposed,
an insulation frame interposed between the plurality of electric storage devices, the insulation frame comprising:
a main plate portion which is in contact with an electric storage device of the plurality of electric storage devices in the first direction, the main plate portion including an end portion in a second direction orthogonal to the first direction and parallel to the lid body, and an other end portion formed opposite the end portion in the second direction;
a first flange portion which extends from the end portion of the main plate portion, the first flange portion including a pressing portion which includes a projecting portion projecting from a surface facing, in the second direction, the electric storage device to be pressed on the electric storage device; and
a second flange portion which extends from the other end portion of the main plate portion in the second direction, the second flange portion including a support portion which is in contact, in the second direction, with the electric storage device,
wherein the projecting portion comprises a rib projecting toward and abutting against the electric storage device, and
wherein the support portion comprises a flat surface which contacts the electric storage device, the flat surface being formed opposite the rib so that a portion of the electric storage device is sandwiched between the rib and the flat surface.

* * * * *